(12) United States Patent
Affoneh et al.

(10) Patent No.: US 10,057,124 B2
(45) Date of Patent: Aug. 21, 2018

(54) RESOLVING CONFIGURATION ERRORS THROUGH RECOMMENDATIONS

(71) Applicant: VMware, Inc., Palo Alto, CA (US)

(72) Inventors: Jehad Affoneh, Kirkland, WA (US); Wit Riewrangboonya, Mountain View, CA (US); David Byard, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 226 days.

(21) Appl. No.: 15/181,026

(22) Filed: Jun. 13, 2016

(65) Prior Publication Data

US 2017/0054601 A1  Feb. 23, 2017

Related U.S. Application Data

(60) Provisional application No. 62/208,509, filed on Aug. 21, 2015, provisional application No. 62/208,456, filed on Aug. 21, 2015.

(51) Int. Cl.
| | |
|---|---|
| *G06F 17/00* | (2006.01) |
| *H04L 12/24* | (2006.01) |
| *G06F 17/30* | (2006.01) |
| *H04L 12/26* | (2006.01) |

(52) U.S. Cl.
CPC .... *H04L 41/0869* (2013.01); *G06F 17/30371* (2013.01); *G06F 17/30522* (2013.01); *H04L 41/0883* (2013.01); *H04L 43/06* (2013.01); *H04L 43/0823* (2013.01); *H04L 43/10* (2013.01)

(58) Field of Classification Search
CPC ........... G06F 17/3037; G06F 17/30371; G06F 17/30522; G06F 17/30303; H04L 41/0856; H04L 41/0869; H04L 41/0883; H04L 43/10; H04L 43/0823
USPC .................. 707/691, 999.202; 709/222, 223
See application file for complete search history.

(56) References Cited

U.S. PATENT DOCUMENTS

| | | | | |
|---|---|---|---|---|
| 6,381,250 B1 * | 4/2002 | Jacobson | ........... | H04B 7/18543 370/254 |
| 7,231,660 B1 * | 6/2007 | Daude | ................. | H04L 61/2015 709/220 |
| 8,953,539 B2 * | 2/2015 | Jung | ................. | H04W 72/0406 370/328 |
| 2005/0027858 A1 * | 2/2005 | Sloth | ................... | H04L 41/5009 709/224 |

(Continued)

*Primary Examiner* — Dung K Chau

(57) ABSTRACT

A method for suggesting network values for configuration parameters, associated with a computing device, that fail validation processes, including: accessing a negative validation, wherein the negative validation signifies that the network configuration parameters, of input, are found to be inconsistent with known network configuration parameters; comparing at least the negative validation with the input and a set of rules to achieve comparison results, wherein the set of rules comprises network configuration information associated with a network, network configuration information associated with the computing device and a predetermined listing of expected formats and expected content of the input; comparing the comparison results with a recommendation table, and based on the comparing the comparison results with the recommendation table, generating a recommendation.

20 Claims, 10 Drawing Sheets

(56) References Cited

U.S. PATENT DOCUMENTS

| | | | |
|---|---|---|---|
| 2005/0125516 A1* | 6/2005 | Molnar | H04L 41/082 709/223 |
| 2008/0125043 A1* | 5/2008 | Karmanenko | H04W 12/10 455/41.2 |
| 2010/0191965 A1* | 7/2010 | Fischer | H04L 63/123 713/168 |
| 2011/0040860 A1 | 2/2011 | Decusatis et al. | |
| 2013/0031037 A1 | 1/2013 | Brandt et al. | |
| 2014/0040443 A1* | 2/2014 | Syu | H04W 24/02 709/222 |

* cited by examiner

1000

- ACCESSING A VALIDATED PORTION OF INPUT, WHEREIN THE VALIDATED PORTION OF INPUT HAS BEEN DETERMINED TO BE CONSISTENT WITH INFORMATION INTERNAL TO THE COMPUTING DEVICE
  1005

- DETERMINING IF A CONTENT OF THE VALIDATED PORTION OF INPUT IS SUFFICIENT TO ENABLE A NETWORK VALIDATION TO BE PERFORMED, THEREBY ACHIEVING A POSITIVE NETWORK PROBE DETERMINATION OR A NEGATIVE NETWORK PROBE DETERMINATION
  1010

- BASED ON ACHIEVING THE POSITIVE NETWORK PROBE DETERMINATION, QUERYING THE EXTERNAL NETWORK TO DETERMINE IF THE EXTERNAL NETWORK INCLUDES A CONFIGURATION ENABLING A FUNCTIONING OF THE COMPUTING DEVICE THEREIN, WHEREIN THE EXTERNAL NETWORK IS EXTERNAL TO THE COMPUTING DEVICE
  1015

- BASED ON THE QUERYING, GENERATING A NETWORK VALIDATION DETERMINATION, WHEREIN THE NETWORK VALIDATION DETERMINATION INCLUDES A DETERMINATION AS TO WHETHER OR NOT THE EXTERNAL NETWORK INCLUDES A CONFIGURATION ENABLING A FUNCTIONING OF THE COMPUTING DEVICE
  1020

- IF THE NETWORK VALIDATION DETERMINATION INDICATES THAT THE EXTERNAL NETWORK INCLUDES THE CONFIGURATION ENABLING THE FUNCTIONING OF THE COMPUTING DEVICE, THEN SENDING A SUCCESS NOTIFICATION TO THE USER
  1025

- IF THE NETWORK VALIDATION DETERMINATION INDICATES THAT THE EXTERNAL NETWORK DOES NOT INCLUDE THE CONFIGURATION ENABLING THE FUNCTIONING OF THE COMPUTING DEVICE, THEN SENDING AT LEAST ONE ERROR NOTIFICATION TO THE USER
  1030

- ACCESSING THE INPUT; DETERMINING THAT A CONTENT OF THE INPUT CONFORMS TO A FORMAT EXPECTED BY THE COMPUTING DEVICE, TO ACHIEVE A VALIDATED INPUT; AND BASED ON THE VALIDATED INPUT, BEFORE THE ACCESSING, AT 305, OF THE VALIDATED PORTION OF INPUT, DETERMINING THAT A PORTION OF THE VALIDATED INPUT THAT IS PART OF A CONFIGURATION MODEL OF THE COMPUTING DEVICE IS CONSISTENT WITH CONFIGURATION INFORMATION OF THE COMPUTING DEVICE, THEREBY ACHIEVING THE VALIDATED PORTION OF INPUT
  1035

- STORING THE VALIDATED PORTION OF THE INPUT
  1040

- MONITORING THE FLOW OF THE INPUT
  1045

- REPORTING THE OCCURRENCE OF THE CESSATION OF THE FLOW OF INPUT
  1050

FIG. 10

RESOLVING CONFIGURATION ERRORS THROUGH RECOMMENDATIONS

RELATED U.S. APPLICATIONS

This application claims priority to and benefit of U.S. Provisional Patent Application No. 62/208,509, filed on Aug. 21, 2015, entitled 'RESOLVING CONFIGURATION ERRORS THROUGH RECOMMENDATIONS" by Jehad Affoneh et al., which is herein incorporated by reference in its entirety.

This application claims priority to and benefit of U.S. Provisional Patent Application No. 62/208,456, filed on Aug. 21, 2015, entitled 'DEEP NETWORK VALIDATION OF CONFIGURATION INPUTS FOR A NETWORK-DEPENDENT SYSTEM" by David Byard et al., which is herein incorporated by reference in its entirety This application is related to co-pending U.S. patent application Ser. No. 15/181,109, filed on Jun. 13, 2016, entitled "DEEP NETWORK VALIDATION OF CONFIGURATION INPUTS FOR A NETWORK-DEPENDENT SYSTEM," by David Byard et al., and assigned to the assignee of the present application.

BACKGROUND

Typically, when a consumer product is added to a system and the consumer product is functionally dependent on configuration parameters that are associated with a network, an automatic setup is performed with some type (network setting or product setting information) of input being provided by the consumer. The consumer/user either determines that his/her user input is correct and then attempts to complete the setup process, or alternatively, attempts to complete the setup process while hoping that his/her user input is correct, with the intention of later troubleshooting any setup issues.

For example, if a system is dependent on a value for a DNS server, a user will typically either write a tool to verify that the DNS server is set up properly or, alternatively, enter a value to see if the system eventually reacts properly. Thus, in an effort to complete the setup of the DNS server within the system (or any other consumer product), the user either spends time and resources on determining that the input is correct, or, alternatively, assumes that the input is correct, forges ahead with the setup, and possibly creates an issue later on that requires troubleshooting.

In another example, a user may take the time to verify that a specific IP address is correctly associated with a node or a service. In yet another example, a user spends the time verifying that a range of IP addresses is available for use or that one or more nodes are configured to use ports in a specific manner. As noted, such validation takes time and resources, and therefore such options make user validation of configuration inputs more difficult and expensive.

Thus, limitations exist with current methods and systems for validating configuration inputs and resolving configuration errors for a network-dependent system.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically notes.

FIG. 10 depicts a flow diagram for a method for deep network validation of configuration inputs for a network-dependent system, in accordance with an embodiment.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Recommending Network Values for Configuration Parameters that Fail Validation Processes The discussion below begins with a discussion of a system (See FIGS. 1, 2 and 3) and method of operation (See FIG. 4) for suggesting network values for configuration parameters that fail validation processes. An example computer system is described, upon which the system operates and the methods of operation utilize (See FIG. 5). Next, a description of an "Appliance" (See FIG. 6) and a "Host Computing System" (See FIG. 7) is presented. Then, a description of a system and method for suggesting network values for configuration parameters that fail validation processes and while testing a validity of the configuration parameters is described with reference to FIG. 8, which includes both a recommendation engine (See FIGS. 1-4) and a deep network validator. FIGS. 9 and 10 describe a deep network validator and its operation.

1. Recommendation Engine

When a user wishes to integrate a computing device within an existing network environment, the setup process for such includes the validation of network configuration parameters entered by the user or communicated by a third-party application. Such a validation process includes at least a syntactical level analysis and a configuration model level analysis. The syntactical level analysis analyzes the format of the user input as compared to a format expected to be used by the computing device. The configuration model level analysis analyzes the portion of the configuration model that is validated at the syntactical level and this validated portion's consistency with other portions of the configuration model. However, even though the configuration parameters may be determined to be syntactically correct, it is possible that the configuration parameters may also be invalidated by later validation processes (e.g., the configuration model level analysis, and an environmental level analysis [see FIGS. 8-10]). Embodiments of the present technology provide a system and method for suggesting network values for configuration parameters that fail validation processes.

Figure 1:
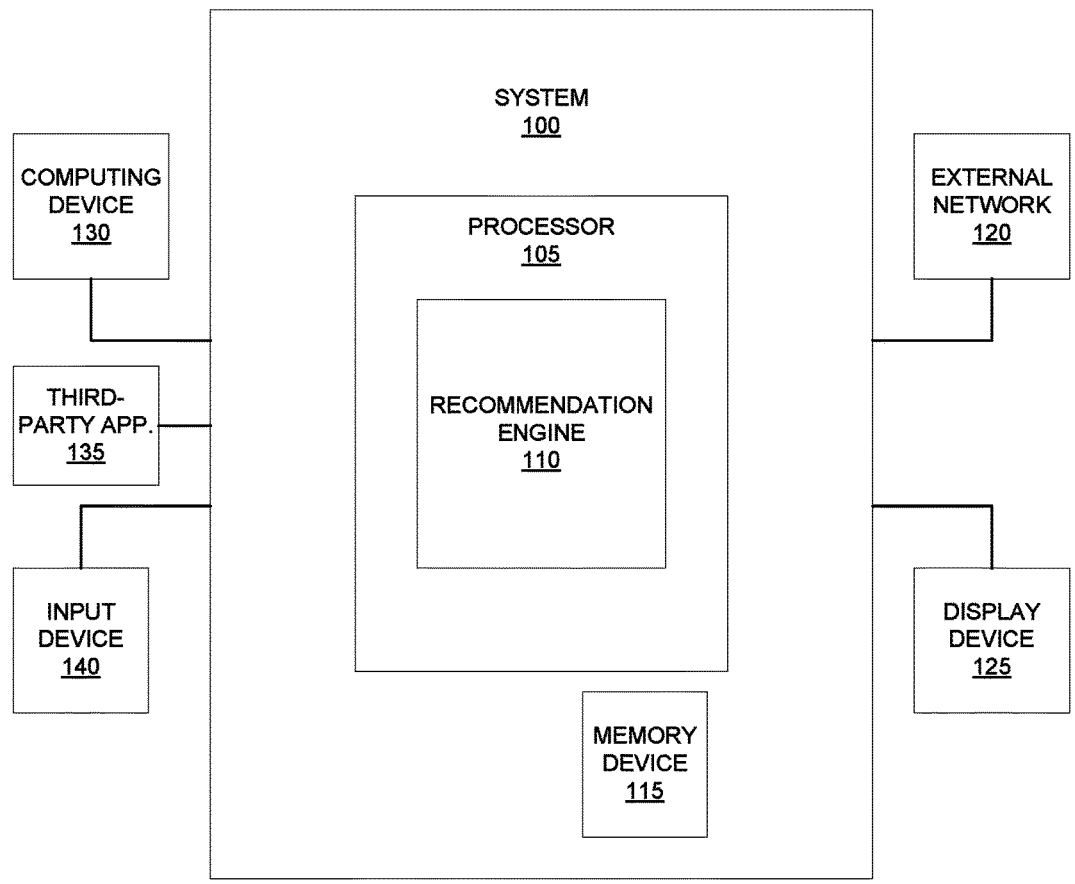
FIG. 1 depicts a block diagram of a system for suggesting network values for configuration parameters that fail validation processes, in accordance with an embodiment.

With reference to FIG. 1, a system for suggesting network values for configuration parameters that fail validation processes. FIG. 1 shows a system 100 that includes a processor 105 communicatively coupled with a computing device 130 and an external network 120. In one embodiment, the recommendation engine 110 resides at the processor 105. However, in another embodiment, the recommendation engine 110 is communicatively coupled with but resides external to the processor 105. In another embodiment, the recommendation engine 110 resides at/on the computing device 130 and/or the external network. It should be appreciated that the recommendation engine 110 may be communicatively coupled with the input device 140 and/or a third party application 135.

Figure 2:
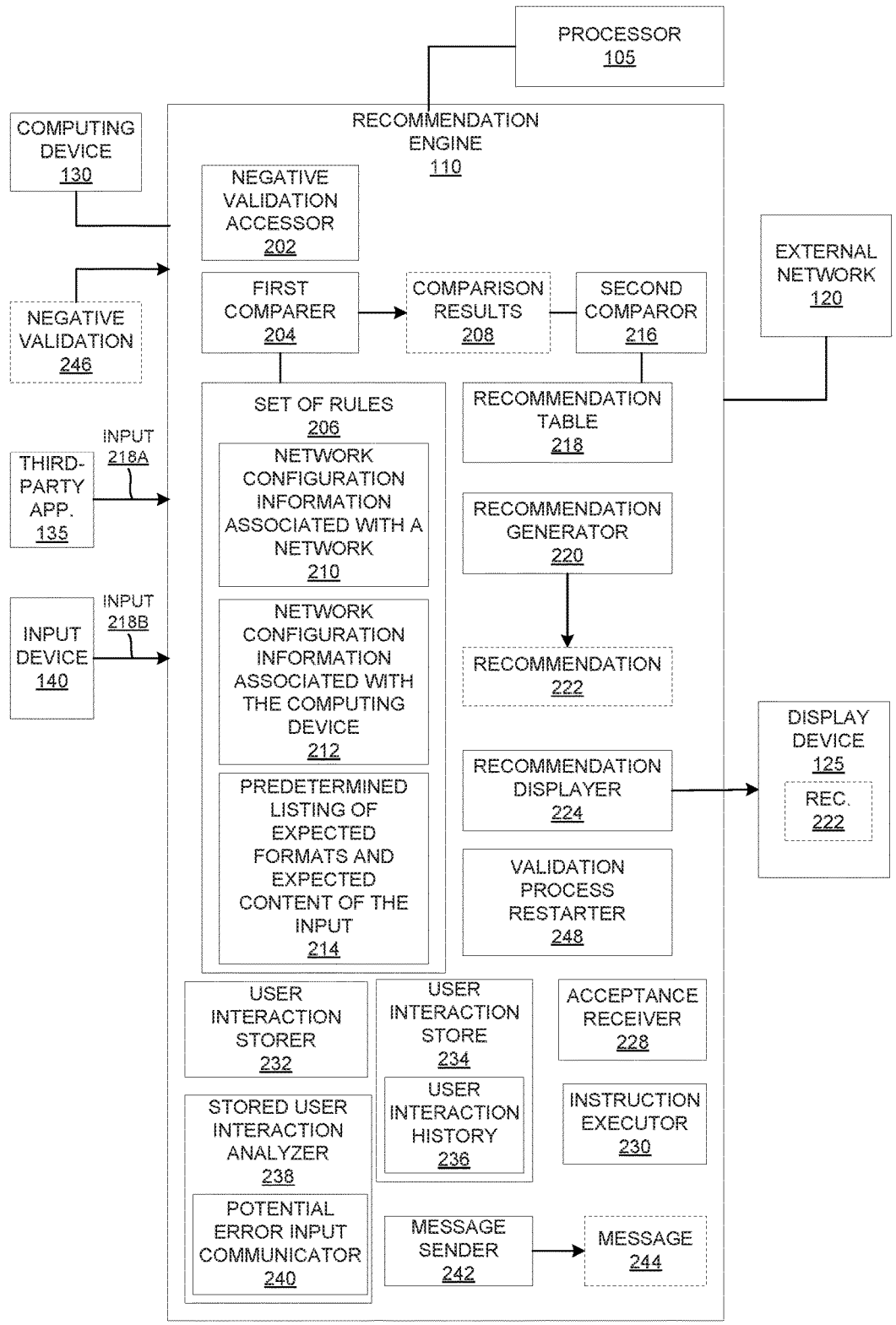
FIG. 2 depicts a block diagram of a recommendation engine, in accordance with an embodiment.
Figure 3:
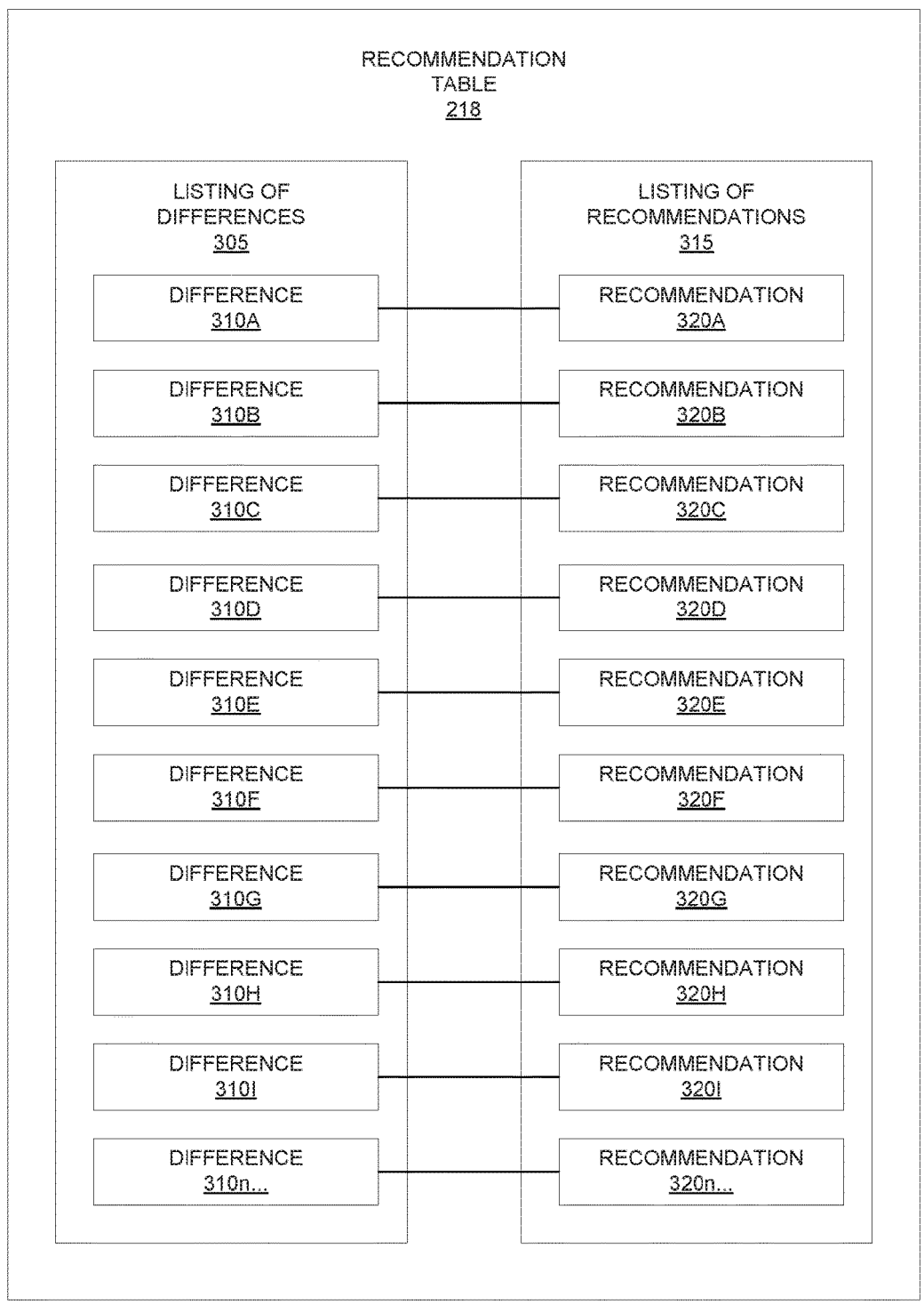
FIG. 3 depicts a block diagram of a recommendation table, in accordance with an embodiment.

With reference now to FIG. 2, a block diagram of the recommendation engine 110 for suggesting network values for network configuration parameters that fail validation processes is shown, in accordance with an embodiment. The recommendation engine 110, in one embodiment, includes: a negative validation accessor 202; a first comparer 204; a second comparer 216; and a recommendation generator 220. Further, various embodiments of the recommendation generator optionally includes, or are communicatively coupled with, any of the following: a set of rules 206 that optionally includes network configuration parameter information (associated with a network 210 (LAN and/or network external to the LAN) and/or associated with the computing device 212) and a predetermined listing 214 of expected formats and expected content of the input; a recommendation table 218; a recommendation displayer 224; an acceptance receiver 228; an instruction executor; a user interaction storer 232; a user interaction store 234 (optionally including a user interaction history 236); a stored user interaction analyzer 238 that includes a potential error input communicator 240; and a message sender 242.

In describing the recommendation engine 110, the following use case scenario will be discussed. A user wishes to integrate a computing device 130 within an existing network environment. The user provides network configuration information as input 218B during setup of the computing device 130. For example, the user inputs (enters) an IP address as part of the network configuration information. A validation process follows, in which it is determined if the network configuration information that the user input 218B enables the computer device 130 to function as intended in the network.

Firstly, a syntactical level analysis is initiated, which determines if the format and content of the input matches the expected format and content. In this example, it is expected that the format of the IP address is to consist of four groups of integers, each separated from each other by a dot. It is determined whether or not the IP address that the user input actually consists of four groups of integers, each separated by a dot. For example, the user enters a first value of an IP range as "10.12.13.14" and a second value of an IP range as "10.11.13.16". If a determination is made that the IP address that is input is the same (i.e., matches) as the expected format of the IP address (IP address(es) that consists of four groups of integers, each separated by a dot", a "validation" at the syntactical level occurs, such that a determination is made as to whether or not the entered IP address matches the expected format of the IP address. In this instance, it is determined that such a match exists.

Subsequent to determining that the "match" exists, at the configuration model analysis level, the syntactically validated portions of the network configuration model are evaluated to determine if the network configuration model is consistent with the other network configuration model information associated with the local area network (LAN). For example, even though the IP address is validated because it consists of four groups of integers, each group separated from each other by a dot, the IP address is also analyzed to determine if the IP address is part of the LAN to which it is intended to be connected. A determination that the IP address is in fact part of the LAN would yield a positive validation at the configuration model level. Likewise, a determination that the IP address is not a part of the LAN would yield a negative validation at the configuration model level. In the afore-mentioned example, the second value of an IP range, "10.11.13.16" is determined not to be part of the LAN to which the computing device is intended to be connected. Thus, a negative validation at the configuration model level is generated.

Upon a determination of a negative validation at the configuration model level analysis, embodiments provide a system 100 and method 400 for generating a recommendation 222 that includes network values for network configuration parameters (that were found to be syntactically correct but in fact failed the validation processes at the configuration model level analysis), the implementation of which enables a successful validation to occur.

For example, the negative validation accessor 202 is configured for accessing the negative validation 246. The term, "accesses" refers to the retrieving or receiving of the negative validation 246 by the negative validation accessor 202. For example, the negative validation accessor 202 accesses the negative validation 246 that was determined from the configuration model level analysis level. This negative validation 246, for example, indicates that the second value of the IP range, "10.11.13.16", is not part of the LAN to which the computing device intended to be connected.

A first comparer 204 is configured for comparing at least the negative validation 246, the information that was input by the user (input 218B) and/or the third-party application 135 (input 218A) and a set of rules 206 to arrive at "comparison results" 208. The "set of rules" 206 at least includes both the network configuration information (associated with the LAN [210] and/or the computing device [212]) and a predetermined listing 214 of the expected formats (syntactical) and the content of input. The "comparison results" 208 at least determine the difference(s) between the content of the information input 218B by the user with the network configuration parameters associated with the LAN.

For instance, and in continuance of the example described above, the first comparor compares the 1) negative validation 246 that was accessed that indicates that the second value of the IP range, "10.11.13.16" is not part of the LAN; 2) the information that was input 218B by the user, "10.11.13.16"; and 3) the set of rules 206 which: a) do not include the IP range, "10.11.13.16" as part of the network configuration information for the LAN; and b) include a predetermined listing 214 of the expected content of the input, which includes values of IP ranges that require the first three sets of numbers, separated by dots, to recite, "10.12.13."

Thus, the comparison results 208, in this example, determine: 1) that the difference between the content of the information input 218B by the user and the network configuration parameters associated with the LAN to be a difference in one whole integer, wherein the second set of numbers in the IP range input 218B by the user is "11" and the network configuration parameters associated with the LAN describe the second set of numbers of the IP range to be "12".

The second comparor 216 compares the comparison results 208 and a table of preconfigured recommendations ("recommendation table" 218). In one embodiment, the recommendation table 218 includes a listing of recommendations, wherein each recommendation of the listing of recommendations corresponds to a difference in a listing of differences. For example, and with reference to FIG. 3, a block diagram of a recommendation table 218 includes the listing of differences 305 and the listing of recommendations 315. The listing of differences 305 includes differences 310A, 310B, 310C, 310D, 310E, 310F, 310G, 310H, 310I and 310n . . . (hereinafter, "differences 310", unless specifically noted otherwise) and the listing of recommendations 315 includes recommendations 320A, 320B, 320C, 320D, 320E, 320F, 320G, 320H, 320I and 320n . . . (hereinafter, "recommendations 320", unless specifically noted otherwise). Each recommendation is linked to a particular difference. For example, difference 310C is denoted as "any number of integers a distance away from the expected value, which is, 'any value of any IP range will have the same first three sets of numbers, separated by dots, and a different fourth set of numbers'". The recommendation 320C that is linked to the difference 310C (shown by a connecting line in FIG. 3) is "Enter the expected value of '10.12.13.' as the first three sets of numbers separated by dots". Thus, since the comparison results show that the difference between the input, "10.11.13" and the expected value, "10.12.13" is a whole integer. The recommendation 320C linked to the difference 310C instructs that the expected value (of "10.12.13") be entered, since the first three sets of numbers will then match the expected value.

It should be appreciated that while the recommendation table 218 is shown to include the listing of differences 305 and the listing of recommendations 314 variously linked to each other, it should be appreciated that in one or more embodiments the recommendation table 218 includes any sort of stored data which identifies an error or difference and links this error or difference with a recommendation for correcting that error and/or minimizing the difference. The recommendation table 218 and the illustrated contents thereof are just one way in which recommendations for specific discovered errors may be identified.

The recommendation generator 220, based on the comparing performed by the second comparer 216, generates the recommendation 222, such that it may be displayed at the display device 125 to the user.

It should be appreciated that more than one difference may be linked to the same recommendation.

In one or more embodiments, the recommendation engine 110 is communicatively coupled with a user interaction storer 232 and a stored user interaction analyzer 238. The user interaction storer 232 stores a history of user interactions (user interaction history 236) occurring with an input device at user interaction store 234. The input device 140 is the same input device that is used to input 218B the network configuration information. For example, if the user interaction storer 232 records that the user commonly mistypes the number "6" by inputting a "5" instead, then stored user interaction analyzer 238 notes this discrepancy and communicates this to the message sender 242 as a message 244 to the recommendation engine 110. Meanwhile, the user interaction storer 232 has recorded the typographical errors and the resultant corrections and stores such a history at the user interaction store 234. In one embodiment, the recommendation generator 220 receives (or retrieves, in another embodiment) the noted discrepancy from the message sender 242 and/or the potential error input communicator 240 of the stored user interaction analyzer 238. The recommendation generator 220 then, in this use case scenario, generates a recommendation 222 that the user should consider changing the number "5" to the number "6".

More particularly, in one embodiment, the user interaction storer 232, coupled with the processor 105, stores information regarding user interaction that occurs with an input device 140 to achieve a stored user interaction history 236, wherein the input device 140 is communicatively coupled with the processor 105.

The stored user interaction analyzer 238, coupled with the processor, in one embodiment, analyzes the stored user interaction history 236. The store user interaction analyzer 238 includes the potential error input communicator 240. The potential error input communicator 240, based on the store user interaction history 236, notes potential input errors by the user. The message sender 242, that is also coupled with the processor 105, sends the message 244 regarding the potential input errors, wherein this message 244 is to be used to generate the recommendation 222.

The recommendation displayer 224 is configured for displaying the recommendation 222 at a display device 125. For example, the recommendation 320C, "Enter the expected value of '10.12.13.' as the first three sets of numbers separated by dots", may be displayed at a display device 125.

The user may then indicate his/her acceptance of this recommendation 222 via any manner known in the art for communicating instructions (e.g., touching a screen, clicking with a mouse, typing on a keyboard, etc.). Upon acceptance of the recommendation, an embodiment executes the instructions for the accepted recommendation by automatically performing such instruction, and then restarts the validation process at the syntactical level. For example, if the user accepted the instruction of entering the expected value of "10.12.13" as the first three sets of numbers separate by dots", then the processor 105 which is communicatively coupled with the recommendation engine 110 would automatically change the "11" to a "12", and then restart the validation process at the syntactical level.

More particularly, an embodiment includes the acceptance receiver 228, which is coupled with the processor 105. The acceptance receiver 228 receives, via the processor 105, an indication of an acceptance of the recommendation 222 from a user. This indication of the acceptance is communicated through the input device 140 that is also coupled with the processor 105.

In one embodiment, an instruction executor 230, which is coupled with the processor 105, executes the instructions according to the recommendation 222.

In another embodiment, the recommendation engine 110 includes a validation process restarter 248. The validation process restarter 248 causes the validation process to restart, after the execution of the instructions according to the recommendation 222 is complete.

Of significance, it should be noted that embodiments may be applied to any level of validation processes for adding a computing device to a network. For example, the set of rules may include not only already known network configuration information associated with a network 210 (a LAN and/or a network external to the LAN) and a computing device 212, and a predetermined listing 214 of the expected formats (syntactical) and the content of input from the user and/or a third-party application, but it may also include any network configuration information that is discovered external to the LAN and the computing device. Further, the recommendation table 218 may, in one or more embodiment, include one or more "difference" (of the list of differences) that involves network configuration information external to the LAN and the computing device.

Of note, the analysis of the second and third level of validation will not proceed until the prior level of validation has been determined to be valid.

2. Methods of Operation

Figure 4:
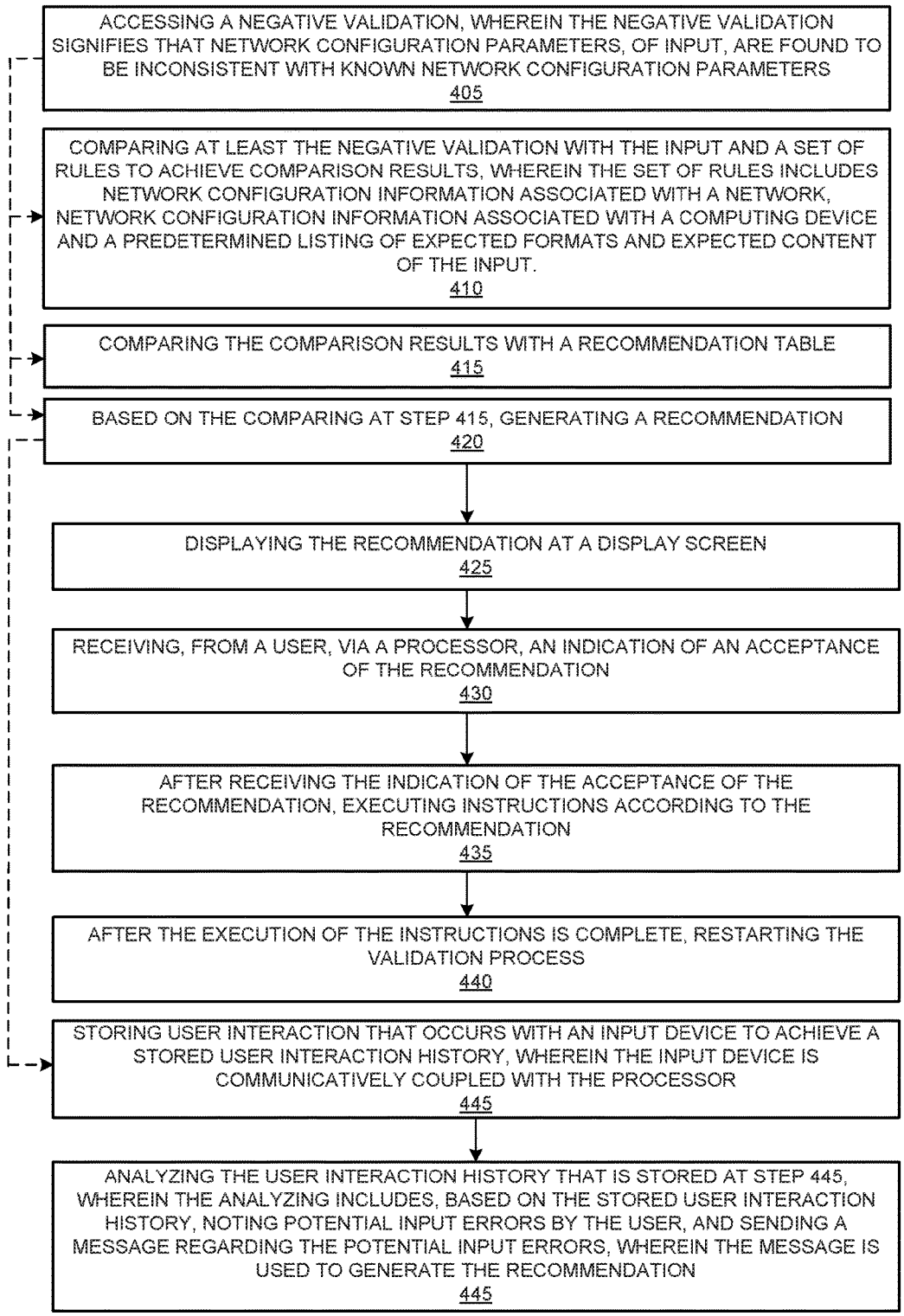
FIG. 4 depicts a flow diagram for a method for suggesting network values for configuration parameters that fail validation processes, in accordance with an embodiment.

The following discussion sets forth in detail the operation of some example methods of operation of embodiments. With reference to FIG. 4, a flow diagram of method 400 illustrates example procedures used by various embodiments. The flow diagram of method 400 includes some procedures that, in various embodiments, may include some steps that are carried out by a processor 105 under the control of computer-readable and computer-executable instructions. In this fashion, procedures described herein and in conjunction with the flow diagram of method 400 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments. The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in the flow diagram of method 400, such procedures are examples. That is, embodiments are well suited to performing various other procedures or variations of the procedures recited in the flow diagram of method 400. Likewise, in some embodiments, the procedures in the flow diagram of the method 400 may be performed in an order different than presented and/or not all of the procedures described in one or more of these flow diagrams may be performed.

The following discussion of the method 400 references FIGS. 1-4 unless specifically noted otherwise.

FIG. 4 depicts a process flow diagram of the method 400 for suggesting network values for configuration parameters, according to various embodiments.

At 405, in one embodiment and as described herein, a negative validation is accessed, wherein the negative validation signifies that network configuration parameters, of input (from the user and/or third-party application), are found to be inconsistent with known network configuration parameters.

At 410, in one embodiment and as described herein, at least the negative validation is compared with the input and a set of rules to achieve comparison results. The set of rules includes network configuration information associated with a network, network configuration information associated with the computing device and a predetermined listing of expected formats and expected content of the input. In one embodiment, the known network configuration information is associated with a LAN. In another embodiment, the known network configuration information is associated with a network external to the LAN. In one embodiment, the network configuration information is already known to the processor and is stored at a memory of the processor. While in another embodiment, the network configuration information is discovered through network probing of components of or coupled with the processor.

At 415, in one embodiment and as described herein, the comparison results are compared with a recommendation table.

At 420, in one embodiment and as described herein, based on the comparing at step 415, of the comparison results with the recommendation table, a recommendation is generated.

At 425, in one embodiment and as described herein, the recommendation that was generated at step 420 is displayed at a display device. For example, the display device is viewable by a user. The user is given an option to accept the recommendation through any manner known in the industry (e.g., touching a screen, clicking with a mouse, keyboarding, using a stylus, etc.).

At 430, in one embodiment and as described herein, an indication of an acceptance of the recommendation (that was displayed at step 425) is received from a user, via the processor. For example, the user used an input device to indicate his/her acceptance of the recommendation.

At 435, in one embodiment and as described herein, after receiving the indication of an acceptance of the recommendation at step 430, instructions according to the recommendation are executed. For example, the processor performs the instructions that are given in the generated recommendation.

At step 440, in one embodiment and as described herein, after the executing of the instructions at step 435 is complete, the validation process is restarted.

At step 445, in one embodiment and as described herein, user interaction that occurs with an input device is stored to achieve a stored user interaction history, wherein said input device is communicatively coupled with the processor.

At step 450, in one embodiment and as described herein, the user interaction history that is stored at step 445 is analyzed, wherein said analyzing includes, based on the stored user interaction history, noting potential input errors by the user. Further, at step 450, a message regarding the potential input errors is sent, wherein this message is used to generate said recommendation.

It is noted that any of the procedures, stated above, regarding a flow diagram of the method 400 may be implemented in hardware, or a combination of hardware with firmware and/or software. For example, any of the procedures are implemented by a processor(s) of a cloud environment and/or a computing environment.

3. Example Computing Environment

Figure 5:
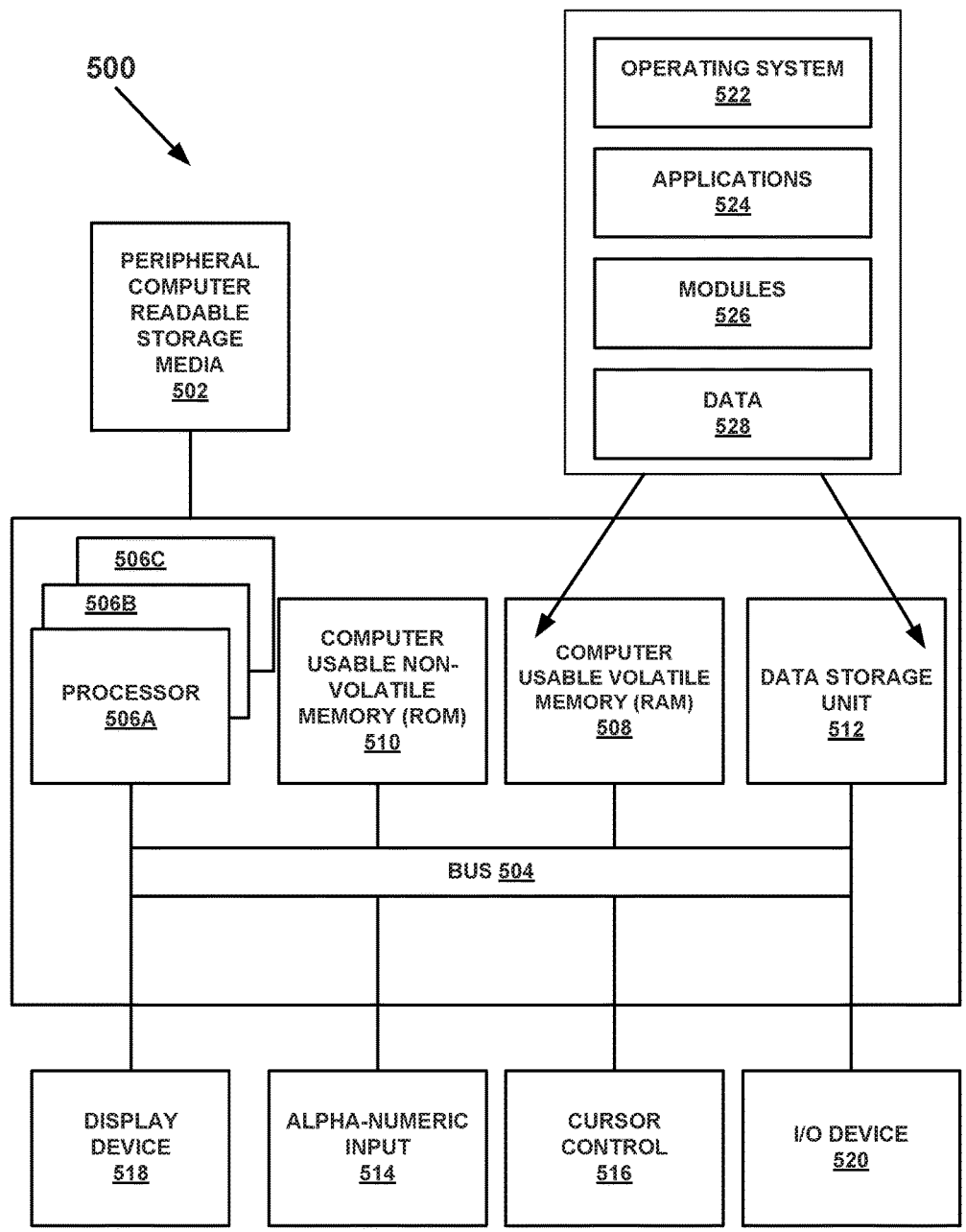
FIG. 5 depicts a block diagram of an example computing system, in accordance with an embodiment.

With reference now to FIG. 5, all or portions of some embodiments described herein are composed of computer-readable and computer-executable instructions that reside, for example, in computer-usable/computer-readable storage media of a computer system. That is, FIG. 5 illustrates one example of a type of computer (computer system 500) that can be used in accordance with or to implement various embodiments which are discussed herein. It is appreciated that computer system 500 of FIG. 5 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, distributed computer systems, media centers, handheld computer systems, multimedia devices, and the like. Computer system 500 of FIG. 5 is well adapted to having peripheral non-transitory computer-readable storage media 502 such as, for example, a floppy disk, a compact disc, digital versatile disc, other disc based storage, universal serial bus "thumb" drive, removable memory card, and the like coupled thereto.

System 500 of FIG. 5 includes an address/data bus 504 for communicating information, and a processor 506A coupled with bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors, and may be the processor 105 described with respect to FIG. 1. System 500 also includes data storage features such as a computer usable volatile memory 508, e.g., random access memory (RAM), coupled with bus 504 for storing information and instructions for processors 506A, 506B, and 506C.

System 500 also includes computer usable non-volatile memory 510, e.g., read only memory (ROM), coupled with bus 504 for storing static information and instructions for processors 506A, 506B, and 506C. In one embodiment, the memory device 115 of FIG. 1 is an example the computer usable volatile memory 508 and/or the computer usable non-volatile memory 510. Also present in system 500 is a data storage unit 512 (e.g., a magnetic or optical disk and disk drive) coupled with bus 504 for storing information and instructions. System 500 also includes an optional alphanumeric input device 514 including alphanumeric and function keys coupled with bus 504 for communicating information and command selections to processor 506A or processors 506A, 506B, and 506C. System 500 also includes an optional cursor control device 516 coupled with bus 504 for communicating user input information and command selections to processor 506A or processors 506A, 506B, and 506C. In one embodiment, the input device 140 of FIG. 1 is an example of the optional alphanumeric input device 514. In one embodiment, system 500 also includes an optional display device 518 coupled with bus 504 for displaying information. In one embodiment, the display device 125 of FIG. 1 is an example of the display device 518.

Referring still to FIG. 5, optional display device 518 of FIG. 5 may be a liquid crystal device, cathode ray tube, plasma display device or other display device suitable for creating graphic images and alphanumeric characters recognizable to a user. Optional cursor control device 516 allows the computer user to dynamically signal the movement of a visible symbol (cursor) on a display screen of display device 518 and indicate user selections of selectable items displayed on display device 518. Many implementations of cursor control device 516 are known in the art including a trackball, mouse, touch pad, joystick or special keys on alphanumeric input device 514 capable of signaling movement of a given direction or manner of displacement. Alternatively, it will be appreciated that a cursor can be directed and/or activated via input from alphanumeric input device 514 using special keys and key sequence commands. System 500 is also well suited to having a cursor directed by other means such as, for example, voice commands. System 500 also includes an I/O device 520 for coupling system 500 with external entities. For example, in one embodiment, I/O device 520 is a modem for enabling wired or wireless communications between system 500 and an external network such as, but not limited to, the Internet.

Referring still to FIG. 5, various other components are depicted for system 500. Specifically, when present, an operating system 522, applications 524, modules 526, and data 528 are shown as typically residing in one or some combination of computer usable volatile memory 508 (e.g., RAM), computer usable non-volatile memory 510 (e.g., ROM), and data storage unit 512. In some or all embodiments described herein, the applications 524 include the recommendation engine 110. In some or all of the embodiments described herein, the modules 526 include any of the following: negative validation accessor 202; first comparor 204; second comparor 216; recommendation generator 220; recommendation displayer 224; acceptance receiver 228; instruction executor 230; validation process restarter 248; user interaction storer 232; stored user interaction analyzer 238; and message sender 242. In some embodiments, all or portions of various embodiments described herein are stored, for example, as an application 524 and/or module 526 in memory locations within RAM 508, computer-readable storage media within data storage unit 512, peripheral computer-readable storage media 502, and/or other tangible computer-readable storage media. In various embodiments, the set of rules 206, the recommendation table 218, the user interaction store 234, the comparison results 208 and the recommendations 222 are stored at memory locations at the computer system 500.

4. Appliance

Figure 6:
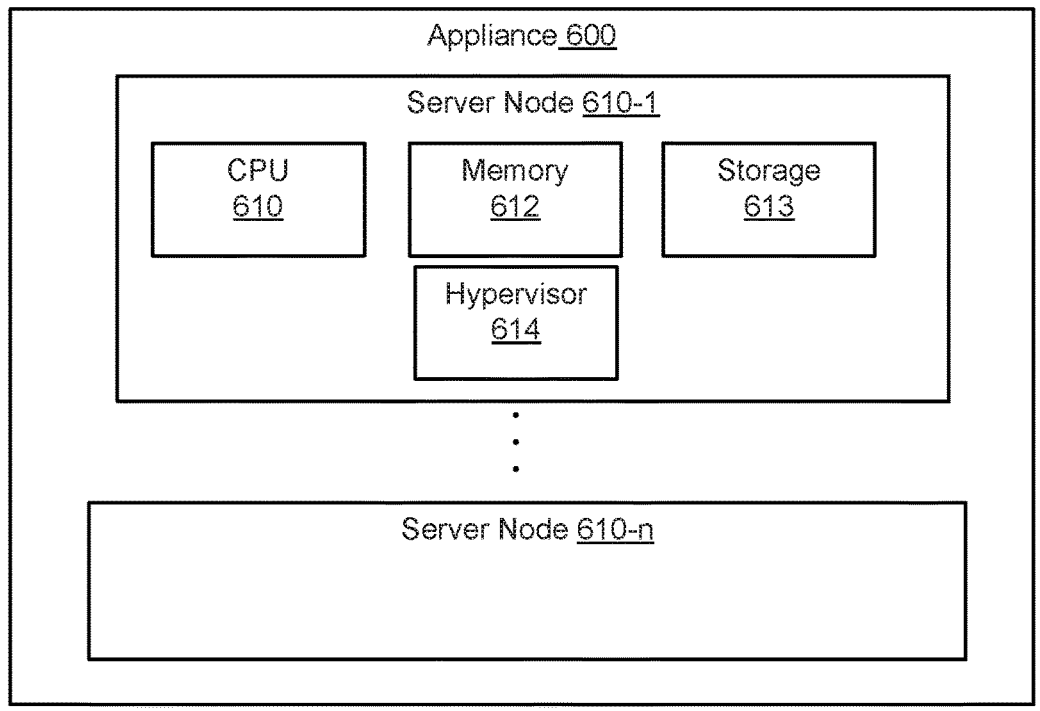
FIG. 6 depicts a block diagram of an appliance, in accordance with an embodiment.

Of note, in one embodiment, the computing device is an "appliance". FIG. 6 is block diagram of an example appliance, in accordance with an embodiment. An appliance includes the requisite physical hardware and software to create and manage a virtualization infrastructure. The appliance is also a pre-configured hyper-converged computing device. In general, a hyper-converged computing device includes pretested, pre-configured and pre-integrated storage, server and network components, including software, that are located in an enclosure. Moreover, the hyper-converged computing device includes a hypervisor that supports a virtualization infrastructure.

Based on the pre-configured hardware and software disposed within the appliance, the appliance enables a user to simply and quickly create a virtualization infrastructure and deploy virtual machines shortly after the appliance is powered on for the first time.

The appliance includes, among other things, at least one server node. For example, server nodes 610-1 through server node 610-n. Server node 610-1 includes a central processing unit (CPU) 611, memory 612, and storage 613. It should be appreciated that other server nodes (i.e., server node 610-n) each include a CPU, memory, and storage similar to server node 610-n.

Additionally, each server node includes a hypervisor. For example, server node 610-1 includes hypervisor 614 and server node 610-n also includes a hypervisor. A hypervisor is installed on top of hardware platform (e.g., CPU, memory and storage) and supports a virtual machine execution space within which one or more virtual machines (VMs) may be concurrently instantiated and executed.

In various embodiments, a hypervisor is VMware ESX™ hypervisor or a VMware ESXi™ hypervisor. It is noted that "ESX" is derived from the term "Elastic Sky X" coined by VMware™. Additionally, as stated above, if hypervisor is a VMware ESX™ hypervisor, then virtual functionality of the host is considered a VMware ESX™ server. Moreover, although the node is physical hardware it includes hypervisor functionality based on the hypervisor implemented on the server node.

The appliance is scalable. That is, the appliance can be scaled to include more than one server node. For example, the appliance can initially have a single server node. However, additional server nodes may be included in the appliance.

In one embodiment, the appliance is able to deploy a plurality of virtual machines in the virtualization infrastructure. For example, based on the hardware and software incorporated in the appliance, the appliance is able to deploy pre-set number of virtual machines (e.g., 75 virtual machines, 150 virtual machines, etc.).

Moreover, each server node may be considered a server or host computing system. That is, each server node is able to independently host a number of virtual machines. For example, server node 610-1 is able to host a first set of virtual machines, while other server nodes are each able to independently host other sets of virtual machines, respectively.

The server nodes are independent of one another, and are not required to share any functionality with one another. The appliance does not include a backplane. As such, the server nodes are isolated from one another and therefore independent of one another.

The CPU may be, but is not limited to, a dual socket CPU (e.g., Intel Xeon™ CPUs, 4-core to 6-core).

The memory may be, but is not limited to, 128 gigabytes (GB).

The storage may be, but is not limited to, three drive slots per node. Such as a solid state drive (SSD) (e.g., an SSD up to 800 GB), and two hard disk drives (HDD) (e.g., HDDs up to 8 terabytes (TB)).

Additionally, the appliance may include various external interfaces, such as but not limited to, serial, network RJ-45 (10000 NIC), graphics, management RJ-45 (100/10000 NIC), power (in front and in rear), UID (in front and in rear) and a USB.

The appliance may also include Component Interconnect Express (PCIe) expansion slots, and a disk controller with pass through capabilities. It should be appreciated that the appliance may include other hardware attributes that are compatible with supporting a virtualization infrastructure.

In one embodiment, the appliance is a rackable 2 U/4Node appliance. That is, the appliance is two rack units in height and includes four server nodes (e.g., server nodes 610-1 through 610-n).

The size of a piece of rack-mounted equipment is described as a number in "U" or "RU" (rack unit). One rack unit is often referred to as "1 U", 2 rack units as "2 U" and so on. "U" is a unit of measure that describes the height of equipment designed to mount in a rack (e.g., 19-inch rack or a 23-inch rack). The 19-inch (482.6 mm) or 23-inch (584.2 mm) dimension refers to the width of the equipment mounting frame in the rack including the frame. In some instances, one rack unit is 1.75 inches (4.445 cm) high.

In another embodiment, the appliance is a 4 U/4Node appliance. That is, the appliance is four rack units in height and includes 4 server nodes (e.g., server nodes 610-1 through 610-n).

The appliance includes software to support a virtualization infrastructure. That is, the appliance includes code or instructions stored on physical hardware in the appliance, that when executed by a processor, supports a virtualization infrastructure. For instance, the appliance includes pre-configured software module.

It should be appreciated that the software installed on appliance 600 is stored in a storage device. In various embodiments, the software may be installed in a single server node or may be distributed in various server nodes. In another embodiment, the software may be stored in a storage device within the appliance but is outside of the server nodes.

During operation of the appliance, the software may be executed by one or more CPUs in a single server node or the execution may be distributed amongst various CPUs in various server nodes.

It should be appreciated that the software module, in one embodiment, includes a suite of software tools for cloud computing (e.g., VMware vSphere™, VCenter™) that utilizes various components such as a VMware ESX/ESXi hypervisor. Accordingly, the software module may be a controlling module for at least appliance 600 based on the controlling software tools (e.g., VMware vSphere™, VCenter™).

The software module, in one embodiment, includes a centralized management tool for an appliance or a cluster of appliances. The centralized management tool, in one embodiment, is for the management of multiple ESX hosts and virtual machines (VMs) from different ESX hosts through a single console application. It should be appreciated that the virtualization infrastructure, or portions of the virtualization infrastructure may be managed by the centralized management tool via a user interface. Additionally, the centralized management tool manages or controls the hypervisors in appliance 600. For example, the centralized management tool controls the hypervisor it runs in and controls the other hypervisors in the other nodes.

5. Example Host Computer System

Figure 7:
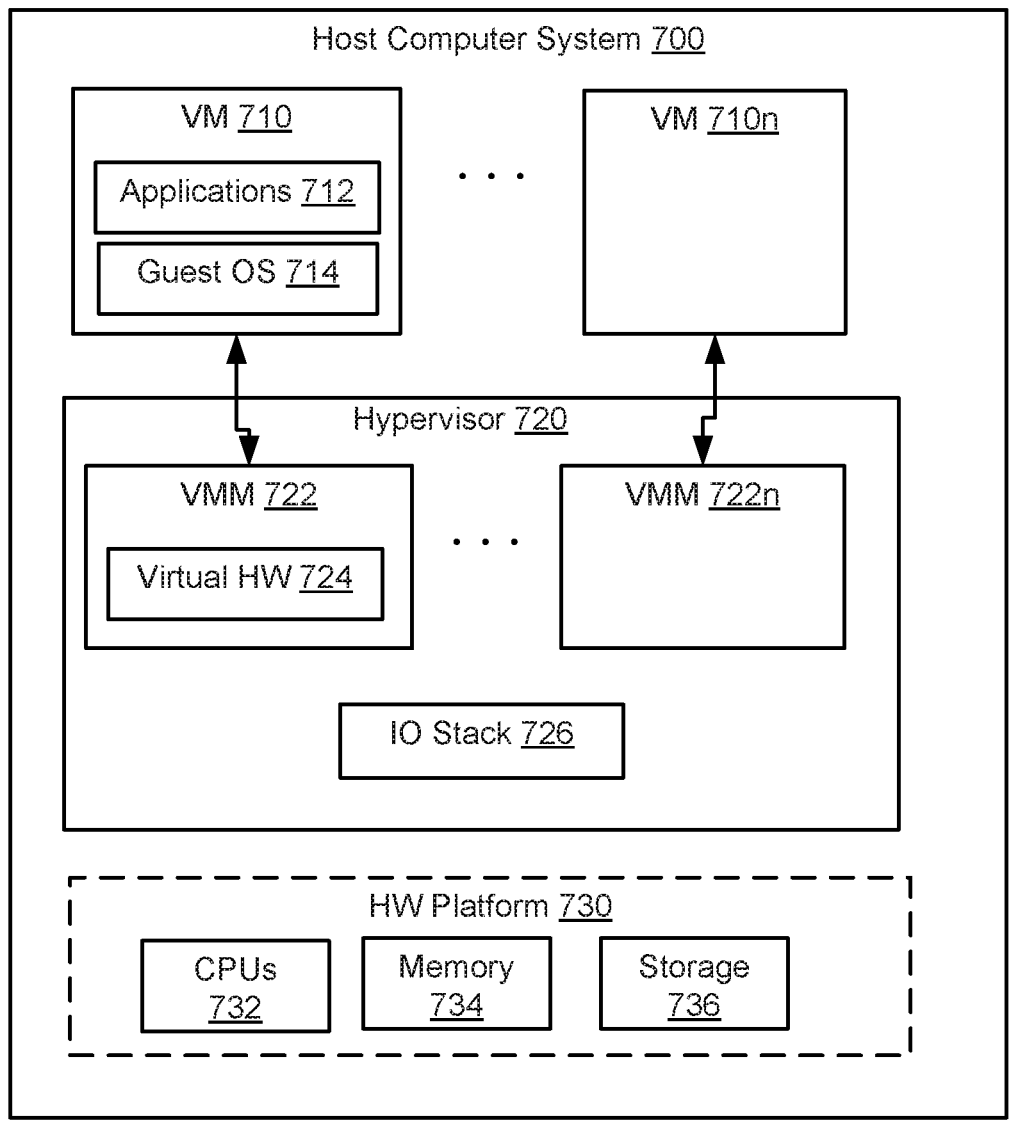
FIG. 7 depicts a block diagram of a host computer system, in accordance with an embodiment.

FIG. 7 is a schematic diagram that illustrates a host computer system 700 that is configured to carry out one or more embodiments of the present invention. Host computer system 700, in one embodiment, is the appliance 600. Host computer system 700 includes, among other things, virtual machines 710 through 710n, hypervisor 720, and hardware platform 730.

Hardware platform 730 includes one or more central processing units (CPUs) 732, system memory 734, and storage 736. Hardware platform 730 may also include one or more network interface controllers (NICs) that connect host computer system 700 to a network, and one or more host bus adapters (HBAs) that connect host computer system 700 to a persistent storage unit.

Hypervisor 720 is installed on top of hardware platform 730 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 724 for virtual machine 710 supports the installation of guest OS 714 which is capable of executing applications 712 within virtual machine 710.

Guest OS 714 may be any of the well-known commodity operating systems, and includes a native file system layer, for example, either an NTFS or an ext3FS type file system layer. IOs issued by guest OS 714 through the native file system layer appear to guest OS 714 as being routed to one or more virtual disks provisioned for virtual machine 710 for final execution, but such IOs are, in reality, reprocessed by IO stack 726 of hypervisor 720 and the reprocessed IOs are issued, for example, through an HBA to a storage system.

Virtual machine monitor (VMM) 722 and 722n may be considered separate virtualization components between the virtual machines and hypervisor 720 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

6. Deep Network Validator

Upon a determination of a negative validation at the environmental level analysis, embodiments provide a system and method for generating a recommendation that includes network values for configuration parameters (that were found to be syntactically correct but in fact failed the validation processes at the environment level analysis), the implementation of which enables a successful validation to occur.

For example, in one embodiment, the negative validation accessor is configured for accessing the negative validation occurring at the environmental level analysis.

In one embodiment, the first comparer is configured for comparing at least the negative validation (occurring after the environmental level analysis), the information that was input by the user and/or a third-party application and the set of rules to arrive at comparison results. In this instance, the set of rules also includes network configuration information that is associated with a network that is external to the computing device and the LAN. This network configuration information is either already known and stored at a memory store (accessible to the comparer), or is discoverable via network probing (as will be explained herein). The first comparer provides the comparison results.

In one embodiment, the recommendation generator compares the comparison results and the table of preconfigured recommendations and then generates the recommendation.

Figure 8:
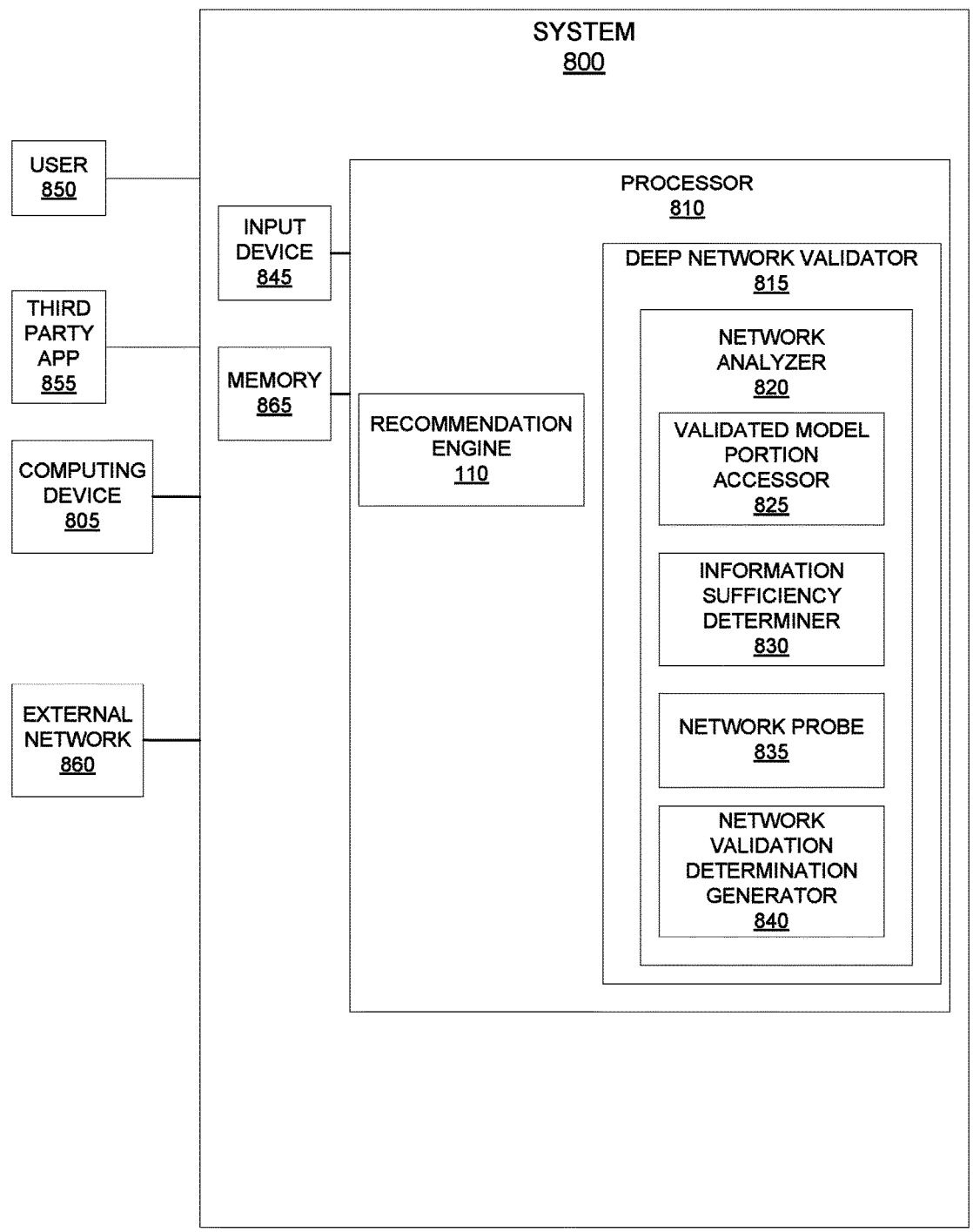
FIG. 8 depicts a block diagram of a system for suggesting network values for configuration parameters that fail validation processes, in accordance with an embodiment.
Figure 9:
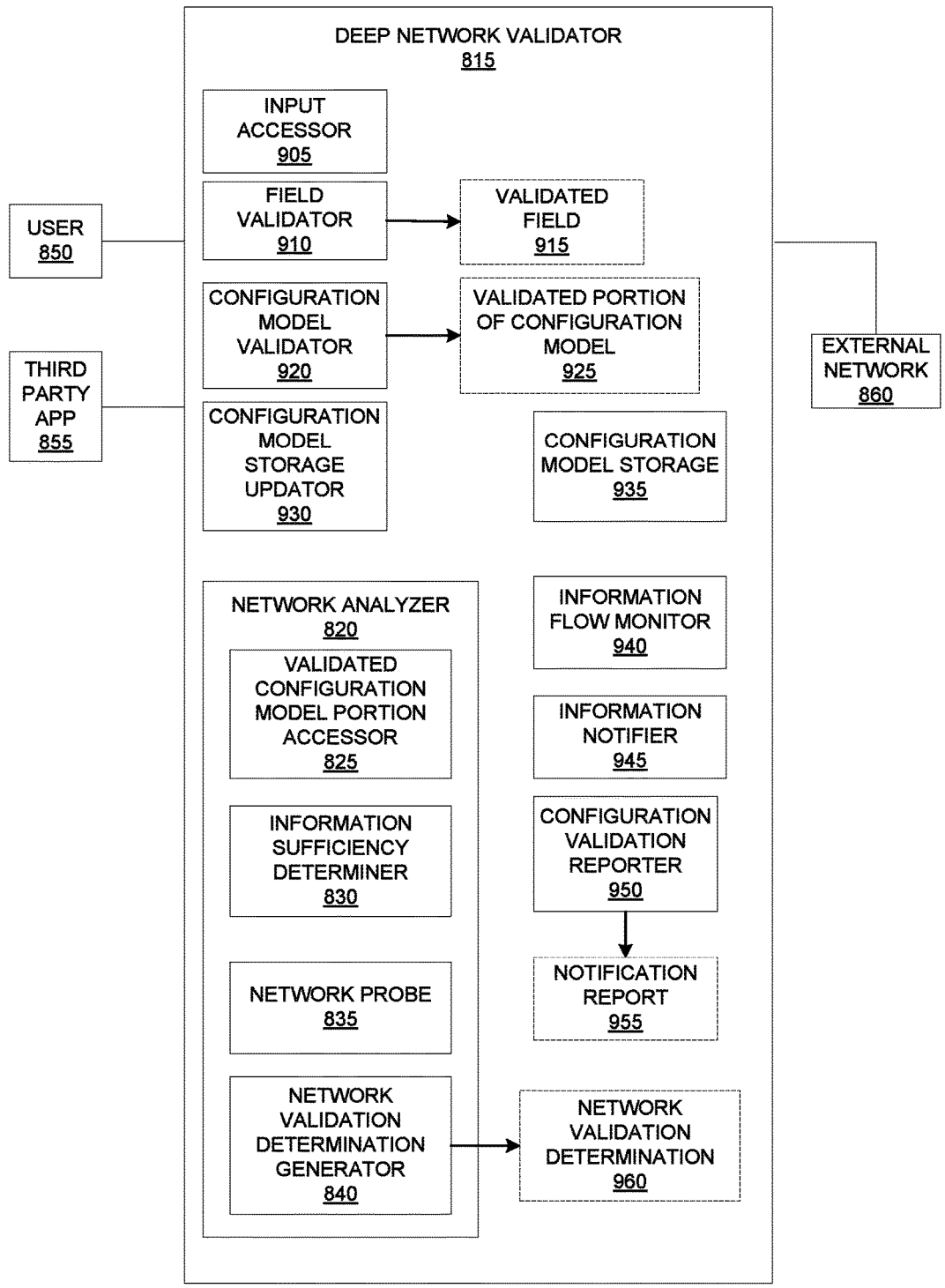
FIG. 9 depicts a block diagram of a deep network validator, in accordance with an embodiment.

FIG. 8 depicts, in accordance with an embodiment, a block diagram of a system 800 that includes the recommendation engine 110 and a deep network validator 815. The system 800 is communicatively coupled a computing device 805, an external network 860 (a network external to the computer device 805, and the LAN), a user 850 and/or a third party application 855, in one embodiment. It should be appreciated that the input device 845, in one embodiment, is communicatively coupled with but external to the computing device 805, but in another embodiment, the input device 845 resides at the computing device 805. The computing device 805 may be a consumer product or part thereof, in various embodiments. Additionally, in one embodiment, the computing device 805 includes the computer 500 of FIG. 5. As shown, a processor 810 is coupled with the computing device 805. However, in another embodiment, the processor 810 resides at the computing device 805. In yet another embodiment, the processor 810 is the computing device 805. In one embodiment, the system 800 includes the input device 845 and the memory 865. However, it should be appreciated that the input device 845 and/or the memory 865 may reside external to but communicatively coupled with the system 800. In one embodiment, the processor 810 includes the deep network validator 815. Additionally, in one embodiment, the processor 810 includes the components of the computer 500 shown in FIG. 5. While the deep network validator 815 is shown to be a part of the processor 810, it should be noted that in one embodiment, the deep network validator 815 may reside external to, but communicatively coupled with the computing device 805.

In one embodiment and as has been explained above in detail, the computing device 805 is an appliance, such as appliance 600. In one embodiment, the deep network validator 815 includes a network analyzer 820. As will be explained below in more detail, the deep network validator 815 includes a network analyzer 820. The network analyzer 820 includes the following components communicatively coupled with each other: a validated model portion accessor 825; an information sufficiency determine 830; a network probe 835; and a network validation determination generator 840.

In various embodiments, the deep network validator 815 further optionally includes any of the following components that may each be communicatively coupled with each other: an input accessor 905; a field validator 910; a configuration model validator 920; a configuration model storage updator 930; a configuration model storage 935; an information flow monitor 940; an information notifier 945; and a configuration validation reporter 950.

The validated model portion accessor 825 is configured for accessing a validated portion of input that was validated at the configuration model level, wherein the portion of information that was validated was determined to be internally consistent with the configuration information found within the computing device 805. (The syntactical level and the configuration model level will be explained below in detail.)

The information sufficiency determiner 830 is configured for determining if the validated portion of input is sufficient to enable a network validation to be performed. The determination of sufficiency is dependent on what is needed to validate the input (e.g., the information that was input and accessed by the input accessor 905). For example, to validate a service at the environmental level depends on the service type. With a read-only service, such as a logger, the IP address is needed to do ping level validation. For a service that can be queried, the IP address and the type of queries accepted (usually known by the type of service) are required.

The network probe 835 is configured for querying the external network 860 to determine if the external network 860 has a configuration enabling a functioning of the computing device 805 therein. As the following examples will discuss, the network analyzer 820 (including the network probe 835) is capable of various functions, in accordance with various embodiments.

For example, in one embodiment, if the user 850 attempts to define or use a Virtual Local Area Network (VLAN) in the user's 850 configuration, the network probe 835 validates that the VLANS can actually facilitate movement of traffic (i.e., they exist on the switch). In one embodiment, the network analyzer 820 validates VLAN configuration by creating one or more temporary port groups on at least two hosts and checks to see if the temporary port groups can communicate. If the VLAN fails to route the traffic, it means that the switch does not have the VLAN configured properly and the VLAN definition is assumed to be invalid.

In another example embodiment, the network analyzer 820 validates that a multicast is set properly over IPv6, if it is in fact the case that the multicast is in fact set properly over IPv6. In one embodiment, it is ensured that all components that are intended to be configured for a multicast are actually properly configured (IGMP—Group Mgmt Protocol—Snooping and Querier, Querier required for snooping to work—settings included) such that the components can correctly communicate with each other. In one embodiment, the network probe 835 validates an IPv6 multicast configuration by creating temporary multicast groups on at least two hosts and checks to see if the multicast groups are able to communicate. If the multicast groups fail to route traffic, then it is determined that the multicast is not configured properly and the IPv6 definition is assumed to be invalid. Thus, in one embodiment, the network analyzer 820 is configured to accept a request to validate IPv6, in response to that request, create one or more temporary multicast groups on two or more hosts, and then determine if the hosts can communicate.

In another embodiment, the network analyzer 820 validates the existence and status of various network services (e.g., NTP, Syslog, DNS, etc.) that are configured by the user 850. In one embodiment, on request to configure a network service, the network probe 835 connects to the network on which the service is sitting to validate whether or not the service is actually listening on that IP and the service is responding to queries. In one embodiment, notifications (such as a notification report 955) are sent to the user 850 by the configuration validation reporter 950 if the service is responding properly (i.e., success), returning errors, not responding to queries but can be pinged, or is not responding to pings.

In another embodiment, the network analyzer 820 validates conflicts to confirm that no one is using an IP address that is to be assigned to an IP pool. Each IP in the IP pool is pinged or checked by the network probe 835 to make sure that nothing is responding on that IP. In one embodiment, a response means that the IP is being used by another and that, therefore, the configured IP is considered invalid. In one embodiment, the network analyzer 820 is configured to accept requests to determine that one or more IP addresses are not being used. In another embodiment, the network analyzer 820 is configured to accept requests to determine that a network service exists at a specific IP address by sending a valid service query to that IP address and processing the response.

When the result of the network validation is determined to be valid (i.e., successful), the configuration validation reporter 950 sends a success notification (in a notification report 955) to the user 850. If the result of the network validation is determined to be invalid (i.e., fails), the configuration model storage is not updated and the configuration validation reporter 950 sends one or more error messages (in a notification report 955) to the user 850. Of note, when messages are sent to the user 850, as described herein, it is meant that these messages (or notification report(s) 955) are sent directly and/or indirectly (i.e., through a mediator) to the user 850. In one embodiment, the user 850 is sent a message (notification report 955) that describes which field, of a quantity of fields, is correct. Of note, in one embodiment, a message (notification report 955) is displayed at a display screen of the system 800.

The network validation determination generator 840 is configured for, based on the querying performed by the network probe 835, generating a network validation determination 960. In one embodiment, the network validation determination 960 is a determination that the external network 860 has a configuration that enables a functioning of the computing device 805 therein. However, in another embodiment, the network validation determination 960 is a determination that the external network 860 does not have a configuration that enables a functioning of the computing device 805 therein In one embodiment, the input accessor 905 accesses the input. In the context of features of embodiments, the term assesses refers to either receiving input or retrieving input from another source (i.e., user 850, third party application 855, etc.) The input, in one embodiment, is user 850 input from a user 850. In another embodiment, the input is from a third party application 855. In one embodiment, the input is network configuration information.

In one embodiment, the field validator 910 is configured for validating that a content of a field conforms to a format expected by the computing device 805, thereby achieving a validated field 915. The field validator 910 operates at the syntactical level. For example, the format of the field is checked to see if it is correct as to value types and absolute limits expected by the computing device 805. More particularly, in one embodiment, the field validator 910 may validate that an IPv4 IP address contains four numbers between 0 and 255, each separated by a period.

In one embodiment, the configuration model validator is configured for evaluating the portions of the validated field 915 that are part of the configuration model of the computing device 805 to determine if the configuration model is consistent with the validated field 915. That is, if the configuration information of the computing device 805 is the same as the validated portion of the configuration model 925 of the validated field 915 (input), then at least the portion of the validated field is determined to be consistent and validated. This is accomplished by having assigned a set of rules regarding how different fields are related to each other. For example, if two values are part of a range of IPv4 values, then a logical rule could be created that allows the second value only if the first three numbers in the second value are identical to the first three numbers in the first, and the fourth number in the second value is greater than the fourth number in the first. If the value of the validated portion of configuration model 925 of the validated field 915 that was evaluated does not make the configuration internally inconsistent, this value is stored at the configuration model storage 935 by the configuration model storage updater 930.

The information flow monitor 940 is configured for monitoring the flow of input to the input accessor 905. The information flow monitor 940 determines when the flow of input to the input accessor 905 ceases and resumes. Once the information flow monitor 940 is configured for determining that the flow of the input to the input accessor 905 has ceased, then the information flow monitor 940 notifies the information notifier 945 of such cessation. The information notifier 945 is configured for communicating, to the network analyzer 820, the occurrence of this cessation of input flow.

7. Methods of Operation

The following discussion sets forth in detail the operation of some example methods of operation of embodiments. With reference to FIGS. 4 and 10, flow diagram showing method 400 in conjunction with flow diagram showing method 1000 illustrate example procedures used by various embodiments. The process described in FIG. 2 may occur before or after that method of operation 1000 described in FIG. 10. More particularly, at least steps 405 through 420 of method 400 may be implemented before step 1005 of method 1000 is implemented. Further, steps 405 through 445 of method 400 may be implemented before step 1005 of method 1000 is implemented.

Additionally, in another embodiment, at least steps 405 through 420 of method 400 may be implemented after step 1030 of method 1000 is implemented.

The flow diagram showing the method 1000 includes some procedures that, in various embodiments, may include some steps that are carried out by a processor 105 or 810 under the control of computer-readable and computer-executable instructions. In this fashion, procedures described herein and in conjunction with the flow diagram showing the method 1000 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments. The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in the flow diagram showing the method 1000, such procedures are examples. That is, embodiments are well suited to performing various other procedures or variations of the procedures recited in the flow diagram showing the method 1000. Likewise, in some embodiments, the procedures in the flow diagram showing method 1000 may be performed in an order different than presented and/or not all of the procedures described in one or more of these flow diagrams may be performed.

The following discussion of method 1000 references FIGS. 1-10 unless specifically noted otherwise.

FIG. 10 depicts a process a flow diagram showing method 1000 for validating configuration inputs for a computing device dependent on a network, according to various embodiments.

At 1005, a validated portion of input is accessed, wherein the validated portion of input has been determined to be consistent with information internal to the computing device, according to an embodiment and as described herein.

At 1010, it is determined if a content of the validated portion of input is sufficient to enable a network validation to be performed, thereby achieving a positive network probe determination or a negative network probe determination, according to an embodiment and as described herein. The validated portion of the input, which is at an accessible storage module (e.g., memory), is analyzed to determine if the content thereof includes one or more blocks of data with sufficient information to facilitate a successful probing of the network and a successful network validation. For example, and as described herein, for a network service to be queried, it is necessary for the content of the validated portion of input (that is also stored at an accessible location) to include the IP address and type of query (usually known by the type of network service).

At 1015, based on the positive network probe determination, the external network is queried to determine if the external network includes a configuration enabling a functioning of the computing device therein, wherein the external network is external to the computing device, according to an embodiment and as described herein. In one example of an application of an embodiment, if the user attempts to use an external network such as a VLAN, then it is determined, via querying the VLAN, if the VLAN can actually facilitate movement of traffic.

At 1020, based on the querying, a network validation determination is generated, wherein the network validation determination includes a determination as to whether or not the external network includes a configuration enabling a functioning of the computing device therein, according to an embodiment and as described herein. For example, the network validation determination could either indicate that the external network includes or does not include a configuration that enables the computing device to function as intended. For example, a user intends to use a VLAN via his/her computing device (that is being setup) by including the VLAN in the input (as network configuration information). However, embodiments determine that the VLAN is unable to route traffic. Embodiments generate a network validation determination that the VLAN is unable to route traffic (as a switch does not have a VLAN configured properly). Therefore, as it is specified in the input (network configuration information) that the computing device is to use the VLAN and the probing of the VLAN shows that the VLAN is unable to actually route traffic, then it is determined that the computing device is unable to function as intended.

For example and at 1025, if the network validation determination indicates that the external network includes the configuration enabling the functioning of the computing device, then a success notification is sent to the user, according to an embodiment and as described herein. In another example and at 1030, if the network validation determination indicates that the external network does not include the configuration enabling the functioning of the computing device, then at least one error notification is sent to the user, according to an embodiment and as described herein.

At 1035, the input is accessed; it is determined if a content of the input conforms to a format expected by the computing device, to achieve a validated input; and based on the validated input, before the accessing (at 1005) of the validated portion of input, it is determined that a portion of the validated input that is part of a configuration model of the computing device is consistent with configuration information of the computing device, thereby achieving the validated portion of input, according to an embodiment and as described herein. As described herein, the accessing of the input refers to, in one embodiment, features of the invention retrieving the input. Yet, in another embodiment, accessing the input refers to features of the invention receiving the input. As also described herein, the determining that a content of the input conforms to a format expected by the computing device occurs at the syntactical level. The determining that the portion of the validated input that is part of the configuration model of the computing device is consistent with the configuration information of the computing device occurs at the model configuration level.

In one embodiment, the input is user input. For example, in one embodiment, during setup, the user enters information associated with the computing device, wherein such information specifies network configuration information. In another embodiment, the input is third party application input.

At 1040, the validated portion of the input referred to in step 1035 is stored, according to an embodiment and as described herein. In one embodiment, the validated portion of the input is stored at the computing device. In another embodiment, the validated portion of the input is stored external to the computing device.

At step 1045, the flow of the input in step 1035 is monitored, according to an embodiment and as described herein. For example, the flow of input refers to the accessing of the input, either through retrieving or receiving, and either from a user or a third party application. Once the accessing of input stops, so too does the flow of input. Embodiments determine if this flow of input is continuing or has ceased. In one embodiment, this determination of the continuance or the cessation of the flow of input is based timing. For example, in one embodiment, if it is determined that a predetermined period of time has elapsed and a flow of input has not been detected, then it is determined that the flow of input has ceased.

At step 1050, the occurrence of the cessation of the flow of the input described in step 1045 is reported, according to an embodiment and as described herein. In one embodiment, the cessation of the flow of the input is reported to a component of the deep network validator, such as, for example, the network analysis module.

In one embodiment, a request to validate that one or more IP addresses are not being used is accepted. In another embodiment, a request to validate that a network service exists at a specific IP address is accepted, and in response to that request, that specific IP address is pinged. In another embodiment, a request to validate that a network service exists at a specific IP address is accepted, a valid service query is sent to that IP address in response to the request, and then a response to the valid service query is processed.

In another embodiment, a request is accepted to validate IPv6. In response to that request, one or more temporary multicast groups are created on two or more hosts. It is then determined if the hosts can communicate.

In one embodiment, if the user attempts to define or use a VLAN in the user's configuration, it is validated that the VLANS can actually facilitate movement of traffic (i.e., they exist on the switch). In one embodiment, the VLAN configuration is validated by creating one or more temporary port groups on at least two hosts and checked to see if the temporary port groups are able to communicate. If the VLAN fails to route the traffic, it means that the switch does not have the VLAN configured properly and the VLAN definition is assumed to be invalid.

It is noted that any of the procedures, stated above, regarding the flow diagram illustrating the method 1000 may be implemented in hardware, or a combination of hardware with firmware and/or software. For example, any of the procedures are implemented by a processor(s) of a cloud environment and/or a computing environment.

What we claim is:

1. A non-transitory computer-readable storage medium having instructions embodied therein that when executed cause a computer system to perform a method for suggesting network values for configuration parameters, associated with a computing device, that fail a validation process, said method comprising:
   accessing a negative validation, wherein said negative validation signifies that network configuration parameters, of an input, are found to be inconsistent with known network configuration parameters;
   comparing at least said negative validation with said input and a set of rules to achieve comparison results, wherein said set of rules comprises network configuration information associated with a network, network configuration information associated with said computing device and a predetermined listing of expected formats and expected content of said input;
   comparing said comparison results with a recommendation table; and
   based on said comparing said comparison results with said recommendation table, generating a recommendation for said network values for said configuration parameters associated with said computing device.

2. The non-transitory computer-readable storage medium of claim 1, further comprising:
   displaying said recommendation at a display screen.

3. The non-transitory computer-readable storage medium of claim 2, further comprising:
   receiving, via a processor, an indication of an acceptance of said recommendation from a user.

4. The non-transitory computer-readable storage medium of claim 3, further comprising:
   executing instructions according to said recommendation.

5. The non-transitory computer-readable storage medium of claim 4, further comprising:
   after said executing said instructions is complete, restarting a validation process.

6. The non-transitory computer-readable storage medium of claim 1, further comprising:
   storing information regarding user interaction that occurs with an input device to achieve a stored user interaction history, wherein said input device is communicatively coupled with a processor.

7. The non-transitory computer-readable storage medium of claim 6, further comprising:
   analyzing said stored user interaction history, wherein said analyzing comprises:
     based on said stored user interaction history, noting potential input errors by said user; and
   sending a message regarding said potential input errors to be used to generate said recommendation.

8. A recommendation engine for suggesting network values for configuration parameters, associated with a computing device, that fail validation processes, said recommendation engine comprising:
   a negative validation accessor, couple with a processor, said negative validation accessor configured for accessing a negative validation, wherein said negative validation signifies that network configuration parameters, of an input, are found to be inconsistent with known network configuration parameters;
   a first comparor, coupled with said processor, said first comparor configured for comparing at least said negative validation with said input and a set of rules to achieve comparison results, wherein said set of rules comprises network configuration information associated with a network, network configuration information associated with said computing device and a predetermined listing of expected formats and expected content of said input;

a second comparor, coupled with said processor, said second comparor configured for comparing said comparison results with a recommendation table, and a recommendation generator, coupled with said processor, said recommendation generator configured for, based on said comparing said comparison results with said recommendation table, generating a recommendation for said network values for said configuration parameters associated with said computing device.

9. The recommendation engine of claim 8, further comprising:
a recommendation displayer, coupled with said processor, said recommendation displayer configured for displaying said recommendation at a display screen.

10. The recommendation engine of claim 9, further comprising:
an acceptance receiver, coupled with said processor, said acceptance receiver configured for receiving, via said computer, an indication of an acceptance of said recommendation from a user.

11. The recommendation engine of claim 10, wherein said indication of said acceptance is communicated through an input device coupled with said computer.

12. The recommendation engine of claim 9, further comprising:
an instruction executor, coupled with said processor, said instruction executor configured for executing instructions according to said recommendation.

13. The recommendation engine of claim 12, further comprising:
a validation process restarter, coupled with said processor, said validation process restarter configured for, after said executing said instructions is complete, restarting said validation process.

14. The recommendation engine of claim 8, further comprising:
a user interaction storer, coupled with said processor, said user interaction storer configured for storing information regarding user interaction that occurs with an input device to achieve a stored user interaction history, wherein said input device is communicatively coupled with said processor.

15. The recommendation engine of claim 14, further comprising:
a stored user interaction analyzer, coupled with said processor, said stored user interaction analyzer configured for analyzing said stored user interaction history, wherein said stored user interaction analyzer comprises:
potential error input communicator configured for, based on said stored user interaction history, noting potential input errors by said user; and a message sender, coupled with said processor, said message sender configured for sending a message regarding said potential input errors to be used to generate said recommendation.

16. The recommendation engine of claim 8, wherein said known configuration network parameters are associated with a local area network (LAN).

17. The recommendation engine of claim 8, wherein said known configuration network parameters are associated with a network external to a LAN associated with said computer device.

18. The recommendation engine of claim 8, wherein said known configuration network parameters become known after a discovery occurs through a network probing event.

19. A system for suggesting network values for configuration parameters, associated with a computing device, that fail validation processes, said system comprising:
an input device configured for:
receiving user input,
a processor coupled with said input device, said processor configured for:
accessing a negative validation, wherein said negative validation signifies that network configuration parameters, of an input, are found to be inconsistent with known network configuration parameters;
comparing at least said negative validation with said input and a set of rules to achieve comparison results, wherein said set of rules comprises network configuration information associated with a network, network configuration information associated with said computing device and a predetermined listing of expected formats and expected content of said input;
comparing said comparison results with a recommendation table, and based on said comparing said comparison results with said recommendation table, generating a recommendation for said network values for said configuration parameters associated with said computing device;
a memory store coupled with said processor, said memory store configured for storing at least:
said user input; said negative validation; said known network configuration parameters; said set of rules; said recommendation table; and said generated recommendation.

20. The system of claim 19, further comprising:
a display device coupled with said processor, said display device configured for displaying said generated recommendation,
wherein said processor is further configured for:
storing said validated portion of said user input at said memory store.

* * * * *